Oct. 1, 1968     E. F. BLACKBURNE     3,403,662
VARIABLE COMPRESSION RATIO PISTON ASSEMBLY
Filed July 20, 1967
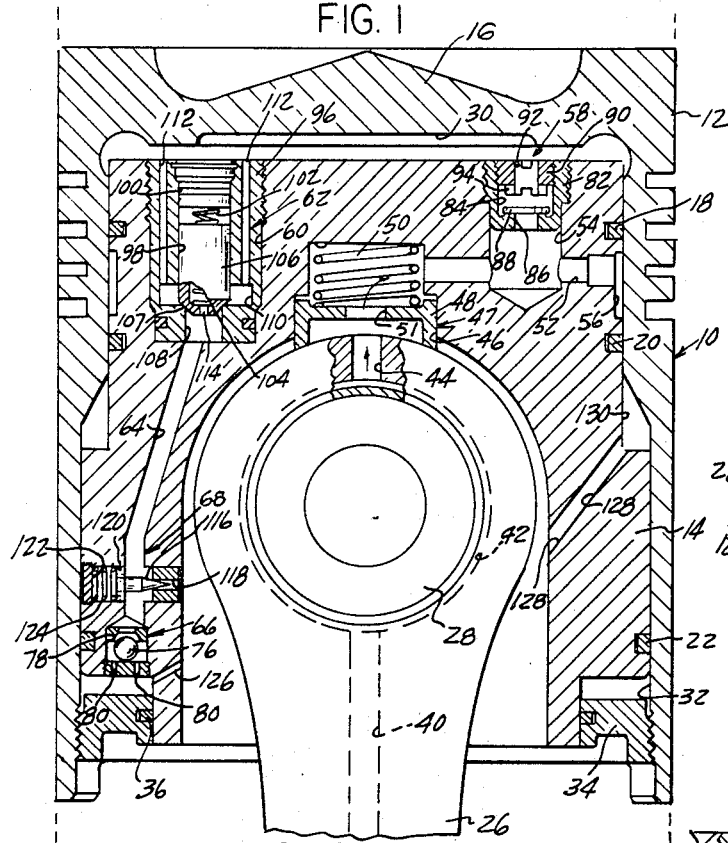
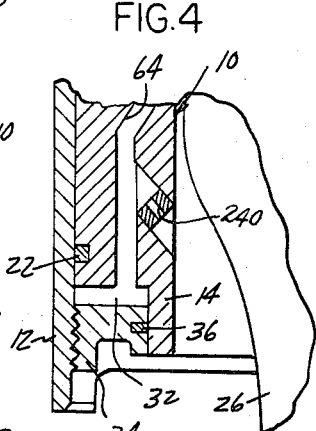
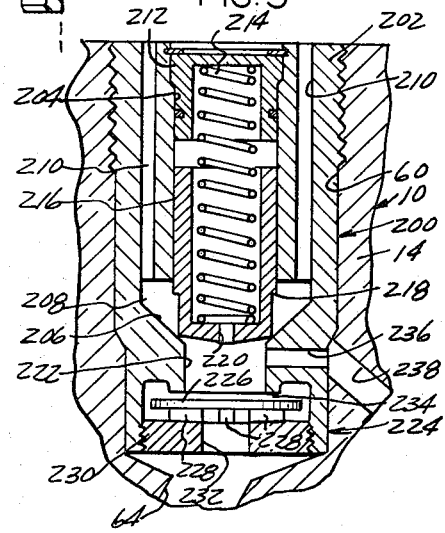
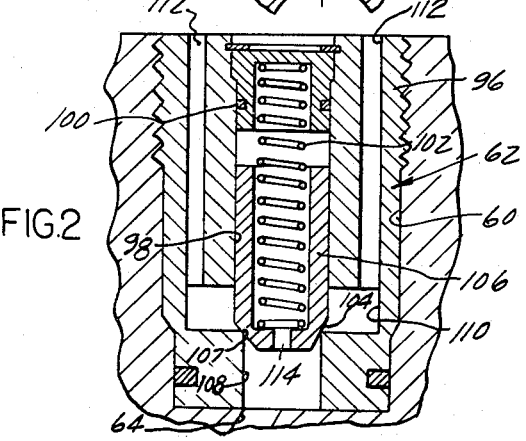
INVENTOR.
EDWARD F. BLACKBURNE
BY
Haake, Kress, & Gifford
ATTORNEYS United States Patent Office 3,403,662
Patented Oct. 1, 1968

3,403,662
VARIABLE COMPRESSION RATIO
PISTON ASSEMBLY
Edward F. Blackburne, Roseville, Mich., assignor to
Continental Aviation and Engineering Corporation, Detroit, Mich., a corporation of Michigan
Filed July 20, 1967, Ser. No. 654,803
10 Claims. (Cl. 123—78)

ABSTRACT OF THE DISCLOSURE

A two-part variable compression ratio piston is provided with an upper and a lower variable volume chamber adapted to contain an incompressible fluid such as oil from the lubrication system of the engine and being interconnected to automatically regulate the compression ratio of the engine to maintain a predetermined maximum combustion chamber pressure by moving one of the parts relative to the other.

Background of the invention

The present invention relates to an internal combustion engine, particularly to such engines employing means for varying the compression ratio thereof and more particularly to improved means for controlling relative movement of two-part pistons for such engines such as those disclosed in U.S. Patent No. 3,156,162 issued Nov. 10, 1964 to William A. Wallace and Robert E. Pecha; U.S. Patent No. 3,161,112 issued on Dec. 15, 1964 to William A. Wallace and Thomas J. Pearsall; U.S. Patent No. 3,185,137 issued on May 25, 1965 to Herman T. Dreyer; U.S. Patent No. 3,185,138 issued on May 25, 1965 to Frank C. Druzynski and U.S. Patent No. 3,311,096 issued on Mar. 28, 1967 to Carl F. Bachle and Roswell E. Carney.

In each of the aforesaid patents, a two-part variable compression ratio (VCR) piston is disclosed in which an inner member or carrier is connected in the usual manner to a connecting rod and carries an outer member or shell which is adapted to move axially to a limited extent relative to the inner member. Clearance spaces are provided between the top and bottom ends of the inner and outer members which form upper and lower variable volume chambers adapted to contain an incompressible fluid such as oil. By controlling the flow of oil to and from these chambers, the movement of the outer member relative to the inner member in response to piston reciprocation and combustion chamber pressure is controlled for varying the clearance volume of the cylinder in which the piston reciprocates in a manner which is apparent from the description in those patents.

In each of those disclosures, however, the fluid circuit used for controlling flow to and discharge from the chambers includes valve means which directs the oil from the external source to both the upper and lower chambers. A discharge valve opens a path from the upper chamber upon an excess of pressure being produced in that chamber and the oil from the upper chamber in that event is dumped directly to the crankcase to produce quick response of the piston to excess combustion chamber pressure.

There have been previous attempts to provide two-part devices in which the inlet to the lower chamber is connected directly to the upper chamber. Such an arrangement would have the advantage that oil pumping losses are minimized in that oil which would otherwise escape the system is directed instead to the lower chamber. Patent Nos. 2,573,688 and 2,573,689 to F. D. Butler issued Nov. 6, 1951 are examples of such arrangements. Such constructions have heretofore had the disadvantage, however, that if they are provided with a restricted orifice discharging from the lower chamber this tends to prevent the piston from collapsing fast enough under excess combustion chamber pressures and if the piston is not provided with a restricted orifice but discharges substantially freely from the lower chamber as in the Butler patents large cyclic movement between the collapsed and expanded position of the piston is produced each time there is even a small pressure change in the combustion chamber and even during normal operation of the engine.

The present invention provides a construction in which the oil is directed through a one-way inlet valve into the upper or first chamber. A one-way discharge valve is provided intermediate the first chamber and the lower or second chamber and is operable to open upon a sufficient pressure increase in the upper chamber to direct the oil into a passage leading to the lower chamber. A one-way inlet valve is provided intermediate the second or lower chamber and the discharge valve and prevents the oil from leaving the lower chamber via the passage between the chambers. A restricted orifice is provided to permit controlled leakage from the lower chamber in the usual manner. This particular arrangement produces a piston which acts substantially like those previously described as long as combustion chamber pressure is below a predetermined maximum value. That is, as long as this condition is maintained, each time the piston approaches the top dead center position at the end of the exhaust stroke and then accelerates in the opposite direction on the intake stroke the momentum of the outer member will tend to force it upwardly relative to the inner member to increase the pressure in the lower chamber and decreases pressure in the upper chamber. Upward movement of the outer member in large increments is prevented by the oil trapped in the lower chamber and thus movement will occur in small increments over several cycles as permitted by leakage from the lower chamber through the restricted orifice.

Unlike the Butler disclosure, however, the present invention provides a variably restrictive pressure relief valve intermediate the discharge valve and the one-way inlet valve to the lower chamber. The pressure relief valve is operable to variably open a secondary discharge path upon an excess of pressure being produced at the inlet to the second chamber. In this way, a quick response to excess combustion chamber pressure is achieved since such excess pressure opens a discharge path intermediate the chambers and bypasses the lower chamber.

It is an object then of the present invention to provide an improved VCR piston construction which permits the use of a more simplified valving arrangement for operation of the piston.

It is another object of the present invention to provide a VCR piston construction in which discharge from the upper chamber is normally directed to the lower chamber but in which quick response to excessive combustion chamber pressure is achieved by providing a variably restricted pressure relief valve intermediate these chambers and operable to open a secondary discharge path upon a predetermined increase in the pressure of the oil transmitted from the upper chamber to the lower chamber.

It is another object of the present invention to improve VCR pistons such as those disclosed in the aforementioned patents by reducing oil pumping losses by providing means discharging at least a portion of the oil from the upper chamber into the lower chamber upon excess combustion chamber pressure being produced.

Still further objects and advantages of the present invention will be readily apparent upon reference to the following description of several preferred embodiments thereof and which refers to the accompanying drawings in which like characters refer to like parts throughout the several views and in which:

FIG. 1 is a vertical, cross-sectional view taken through the axis of a VCR piston embodying the construction of the present invention, FIG. 2 is an enlarged fragmentary, cross-sectional view illustrating a portion of the piston shown in FIG. 1, FIG. 3 is a fragmentary cross-sectional view similar to FIG. 2 but illustrating another preferred construction of the discharge valve disclosed therein, and FIG. 4 is a fragmentary cross-sectional view of a portion of the structure shown in FIG. 1 but illustrating a preferred modification thereof intended for use with the discharge valve illustrated in FIG. 3.

Description

Now referring to the drawings for a more detailed description of the present invention, FIG. 1 illustrates a preferred construction of a VCR piston 10 adapted for use in an internal combustion engine. The piston 10 comprises an outer member or shell 12 which is carried on an inner member or piston pin carrier 14. Outer member 12 has a crown 16 which serves as the head of the piston 10 and which forms the movable wall of the lower boundary of the combustion chamber of the engine. Inner member 14 is axially slidable within and with respect to outer member 12 and is provided with rings 18, 20 and 22 which sealingly engage the inner surface of the outer member 12. Inner member 14 is linked to a crankshaft 24 by a connecting rod 26 and a wrist pin 28 in the conventional manner. Thus, the inner member 14 is movable axially between fixed upper and lower limits in the manner of a conventional piston while the outer member 12 can move axially upwardly and downwardly relative to the inner member 14 within limits which will be presently described.

An upper variable volume chamber 30 is formed intermediate the upper surface of the inner member 14 and the lower surface of the crown 16. A lower variable volume chamber 32 is formed intermediate the lower surface formed by an annular recess at the lower end of the inner member 14 and by the upper surface of a ring 34 fixed to the outer member 12. A sealing ring 36 prevents fluid leakage from the lower chamber 32 intermediate the adjacent surfaces of the inner member 14 and the ring 34.

The ring 34 and the lower surface of the crown 16 defining the chamber 30 provide the limits of axial movement of the outer member 12 relative to the inner member 14. This relative movement provides a variable height from the center of the wrist pin 28 to the top of the piston crown 16 to thereby vary the compression ratio of the engine by varying the clearance volume of the combustion chamber substantially in the manner disclosed in the aforementioned patents.

This movement of the outer member 12 relative to the inner member 14 is automatically controlled by regulating the flow of an incompressible fluid into and out of the chambers 30 and 32. The control fluid preferably comprises oil supplied to the piston 10 from the usual pressurized lubricating oil supply of the engine via an oil passage 38 in the crankshaft 24 and a passage 40 in the connecting rod 26. A one-way valve 39 is carried in the foot of the rod 26 at the entrance to the passage 40. The passage 40 preferably connects with an annular groove 42 encircling the piston pin 28 and leading to an outlet 44 connected to a cavity 46 formed in the inner member 14. A slipper collector assembly 47 similar to that disclosed in the aforementioned patents preferably comprises a collector cap 48 carried in the cavity 46 and urged by a spring 50 into sealing, sliding engagement with the upper surface of the connecting rod 26 so that oil is directed through the outlet 44 into the interior of the cap 48 at all positions of the connecting rod 26 with respect to the axis of the wrist pin 28. An opening 51 is provided in the collector cap 48 which directs the oil to a passage 52 formed in the inner member 14 and connecting across a vertical passage 54 to an annular cooling chamber 56 formed in the outer surface of the inner member 14 adjacent the piston ring area of the outer member 12. The passage 54 connects with the upper chamber 30 through a one-way inlet valve assembly 58.

Communication between the upper chamber 30 and the lower chamber 32 is afforded through a bore 60 carrying a discharge valve assembly 62 and a passage 64 communicating the bore 60 with the chamber 32. A one-way inlet valve assembly 66 is positioned intermediate the passage 64 and the lower chamber 32 and a variably restrictive pressure relief valve assembly 68 is disposed in the passage 64 intermediate the discharge valve assembly 62 and the inlet valve assembly 66.

The valve assembly 39 is of conventional construction and comprises a ball 70 operable to seat in a conical recess 72 to prevent oil from flowing from passage 40 to passage 38 and to move out of the seat 72 to permit oil flow from passage 38 through a series of inlet passages 74 into the passage 40 when there is a sufficient pressure differential or oil flow to move the ball 70 out of its recess. It also should be noted that the inertia forces which produce upward movement of outer member 12 and thus enlarge chamber 30 also tend to open valve assembly 39 at a time when it is necessary for it to be open.

The valve assembly 66 is similar in construction to the valve assembly 39 but is disposed in a direction reverse to that of valve assembly 39. The valve assembly 66 comprises a ball 76 operable to be seated in a conical recess 78 to thereby close oil flow in a direction from the lower chamber 32 and to move out of the recess 78 to open inlets 80 and permit oil flow from passage 64 into the chamber 32. The inertia forces expanding the piston 10 tend to close valve assembly 66.

The valve assembly 58 is also a one-way check valve and preferably comprises a cylindrical casing member 82 threadably received in the passage 54 and having an inner chamber 84 registering with the passage 54 through an axial passage 86. A plate member 88 is carried within the chamber 84 normally in a position extending across the axial passage 86 and thus closing oil flow therethrough. An inner member 90 is threadably received within the casing member 82 and is provided with an axial passage 92 communicating the chamber 30 with the inner chamber 84. A cylindrical boss 94 with arcuate, removed sections defines the connection between the passage 92 and the chamber 84. It is clear that the valve assembly 58 permits oil to flow from the passages 52 and 54 to the upper chamber 30, but does not permit a reverse flow from the chamber 30 to the passage 54. Oil flow acting upon the lower face of the valve plate 88 moves the plate 88 from its seat upwardly against the boss 94. Since the plate 88 is of a smaller diameter than the inner wall defining the inner chamber 84 oil will flow around the outer edge of the plate 88 and through the removed sections of the boss 94 and through the passage 92 into the upper chamber 30. The pressure acting upon the upper face of the valve plate 88 tending to produce a reverse flow of fluid from the chamber 30 to the passage 54 urges the plate 88 against the lower portion of the member 82 and thus closes the passage 86 to block oil flow from the chamber 30 through the valve assembly 58.

The valve assembly 62 as can best be seen in FIG. 2 comprises a substantially cylindrical casing 96 preferably threadably received in the bore 60 and having an inner axial cavity 98. A spring retainer 100 is carried in the cavity 98 and provides the seat for one end of a spring 102 urging a chamfered face 104 of a valve member 106 against a seat 107 formed in the casing member 96. An axial passage 108 formed in the member 96 affords communication between an annular chamber 110 and passage 64 which is normally closed by the valve member 106. A plurality of annularly spaced axially extending passages 112 are formed in the casing 96 to provide communication at all times between the upper chamber 30 and the annular chamber 110. A passage 114 is provided in the end of the valve member 106 so that even in a closed position of the valve member 106 the oil pressure on that portion of the valve 106 disposed within the passage 108 is equal to that of the interior of the valve 106. In this way, the valve member 106 is movable against the spring 102 only in response to increases in pressure within the chamber 110 acting upon that portion of the chamfered face 104 disposed within the chamber 110. When this pressure reaches a predetermined value sufficient to overcome the spring 102 the valve 106 will open and oil will flow from the chamber 30 by way of passages 112, the chamber 110 and past the open valve 106 and into the passage 64.

The valve assembly 68 preferably comprises a needle valve member 116 seating in an orifice 118 connecting the passage 64 with the crankcase sump of the engine. The needle valve 116 is carried by a plate 120 axially, slidably mounted in a bore 122 provided in the inner member 14 and urged by a spring 124 to move the needle valve 116 to a position closing the orifice 118. In this way, the needle valve assembly 68 is responsive to pressure increases acting upon the plate 120 to variably move the needle valve 116 to an open position to thereby open a secondary discharge path from the passage 64 through the orifice 118.

Inner member 14 is provided with a restricted orifice 126 restricting the flow of oil from the lower chamber 32 and opening upwardly therefrom to deter the entry of air during expansion of lower chamber 32. Inner member 14 is also provided with a passage 128 connecting a collection chamber 130 formed intermediate the inner member 14 and the outer member 12 and axially downwardly spaced from the cooling chamber 56 so that any oil which finds its way past the ring 20 into the collection chamber 130 is drained back to the crankcase via the passage 128.

*Operation*

Assuming that the combustion chamber pressure is below a predetermined maximum value which the VCR piston 10 is designed to maintain and that the upper and lower chambers 30 and 32 are both filled with oil, during the latter part of each upward exhaust stroke of the piston 10 and the early part of each downward intake stroke the momentum of the outer member 12 tends to force it upwardly relative to inner member 14 thereby increasing the oil pressure in the lower chamber 32 and causing the valve assembly 66 to close. As this is happening oil is discharged from the chamber 32 at a controlled rate by the restricted orifice 126 thus permitting a gradual cyclic decrease in the volume of the chamber 32. The controlled decrease in the volume of chamber 32 permits an increase in the volume of the chamber 30 and a relative upward movement between the outer member 12 and the inner member 14. As the upper chamber 30 increases in volume, oil from the lubrication system of the engine is directed through the valve assembly 39, through collector assembly 46 and the valve assembly 58 into the upper chamber 30 to fill that chamber.

Thus, as in the previously disclosed constructions, the controlled leakage of oil from the lower chamber 32 through the restricted orifice 126 permits the outer member 12 to move upwardly a very small distance relative to inner member 14 on each cycle of engine operation as long as a predetermined combustion chamber pressure is not exceeded. During the compression and power strokes of the engine the tendency of the outer member 12 to move upwardly with respect to the inner member 14 as produced by inertia is resisted by gas pressure on the piston crown so that during these strokes of the engine cycle there is little if no relative movement between the inner and outer members. The operation of the inlet valve assembly 58 traps the oil in the upper chamber 30 when it is closed by a pressure increase in the upper chamber 30 so that as long as the pressure within chamber 30 is less than that at which valve assembly 62 is designed to open the oil is trapped in chamber 30 and the outer member 12 is prevented from moving back downwardly relatively to the inner member 14. In this way upward movement of the outer member 12 relative to the inner member 14 may occur for several cycles to thereby increase the compression ratio of the engine until the combustion chamber pressure reaches a predetermined maximum value which will open a discharge path from the chamber 30 in a manner which will now be described.

If the combustion chamber pressure is increased beyond a predetermined value it will act on the crown 16 to urge the outer member 12 downwardly with respect to the inner member 14 to increase the pressure within chamber 30 and decrease it within chamber 32. This increase in pressure in chamber 30 if sufficient will act through the passages 112 and the chamber 110 to open the valve member 106 and direct oil from the passage 64 and the open inlet check valve assembly 66 into the lower chamber 32. It is clear then that in normal operations of the piston of the engine a state of relative equilibrium will exist wherein the outer member 12 will move up and down very slightly relative to the inner member 14 in each cycle with its mean relative position being that producing the maximum combustion chamber pressure as predetermined by the setting of the valve assembly 62. In such normal operation, there will be very little oil pumping losses since the system will operate as a substantially closed system with the only leakage being that leaking from the cooling chamber 56 and from the restricted orifice 126. Unlike the previous constructions since the oil is not discharged directly from the upper chamber 30 to the crankcase but is instead directed normally to the lower chamber 32, the resultant pumping losses will not occur.

If the combustion chamber pressure is suddenly increased as by opening the engine throttle or by increasing the load on the engine the present invention is designed so that the outer member 12 can move rapidly downwardly relative to the inner member 14 thereby increasing the cylinder clearance volume and thus reducing the combustion chamber pressure to the desired maximum value within a few cycles of the piston 10. This is achieved through the variably restricted valve assembly 68 and its operation upon an excess pressure increase being produced in the passage 64 to open a secondary discharge path through the orifice 118. Such a secondary discharge path is necessary since the volume of the chamber 30 exceeds that of the chamber 32 and therefore chamber 32 is expanding its capacity for taking the oil discharged from chamber 30 at a slower rate than the rate of volumetric contraction of chamber 30. Thus in cases where sudden downward movement between the outer member 12 and the inner member 14 is desirable it is necessary to bypass the chamber 32 and to discharge a portion of the oil from the chamber 30 to the crankcase.

FIGS. 3 and 4 disclose an arrangement which can be substituted for the discharge valve assembly 62, the valve assembly 68, and the inlet valve assembly 66 of FIGS. 1 and 2. In effect, the modification of FIGS. 3 and 4 combines these assemblies in a unitary valve assembly 200 as shown in FIG. 3 which is adapted to be threadably received within the bore 60 and which comprises a cylindrical casing member 202 having an inner cylindrical chamber 204 terminating at its lower end in a frusto-conical valve seat 206 and forming a substantially annular chamber 208 above the valve seat 206. The chamber 208 registers at all times with the upper chamber 30 through a plurality of axially extending, annularly spaced passages 210 formed in the casing member 202. A hollow spring seat member 212 is fixed within the casing 202 and provides the seat for one end of a spring 214 which biases a hollow cylindrical valve member 216 into engagement with the valve seat 206. The valve member 216 is provided with an annular shoulder 218 disposed within the chamber 208. An axial opening 220 provides communication between the interior of the valve member 216 and a passage 222 formed in the casing 202 and opening to the passage 64 through a one-way check valve portion 224. The valve portion 224 comprises a plate member 226 having legs 228 which normally seat the plate member 226 on a plug 230 carried in the end of the casing 202. An opening 232 is provided in the plug 230 and registers with the passage 64. Reverse oil flow from the passage 64 causes the plate member 226 to move against a valve seat 234 to close flow through the passage 222. A radial passage 236 formed in the casing 202 communicates the passage 222 with a passage 238 formed in the inner member 14 and opening to the crankcase of the engine. As shown in FIG. 4, the inner member 14 is provided with a restricted orifice 240 which registers with the passage 64 which in this embodiment opens directly to the lower chamber 32.

The modification illustrated in FIGS. 3 and 4 produces the same result as achieved in the embodiments of FIGS. 1 and 2 but utilizes a somewhat more simplified construction in doing so. As described above, with reference to the value assembly 62 the valve member 216 of the valve assembly 200 is opened upon an increased pressure differential within the annular chamber 208 which acts upon the shoulder 218 to urge the valve member 216 upwardly and to open communication between the chamber 30 and the passage 222. As long as pressure within the passage 222 exceeds that within chamber 32 the valve plate 226 will be in the position shown in FIG. 3 and oil will flow from the chamber 30 to the chamber 32. When the combustion pressure exceeds the predetermined maximum value to such an extent that the chamber 32 is unable to accommodate all of the oil directed to it some of the oil entering the passage 222 will be discharged through the lateral passage 236 and the diagonal passage 238 directly to the crankcase of the engine. When the pressure in chamber 32 exceeds that in chamber 30 or when there is a tendency for the oil to flow in a reverse direction from the chamber 32 to the chamber 30 the valve plate 226 will be moved upwardly against the valve seat 234 to thereby close the passage 222 from the passage 64. This of course prevents the outer member 12 from moving too rapidly to its upper extreme position and permits a rate of relative movement of the members corresponding to the amount of oil discharged through the restricted orifice 240 in the same manner as described above.

It is apparent that a construction for VCR pistons somewhat similar to those disclosed in the aforementioned patents has been described herein. Unlike those previously disclosed VCR pistons, however, the present disclosure provides a much more simplified arrangement in that fewer and simpler valves can be employed for the automatic regulating means without sacrificing reliability or the desired characteristics of operation of the piston. Further, by normally discharging oil from the upper chamber to the lower chamber and only discharging oil directly to crankcase from the upper chamber in situations where this is necessary the desired operating characteristics have been achieved without the inefficiencies in engine operation produced by oil pressure losses. Thus, reduced oil losses from the system tend to reduce the horsepower of the engine diverted to produce the regulation of the piston and tend to cause an increase in the final shaft output of the engine. A smaller oil pump can be used increasing engine output capabilities and reducing the size and weight requirements.

It is also apparent that although I have described but several embodiments of the present invention other changes and modifications can be made therein without departing from the spirit of the invention or the scope of the appended claims.

I claim:
1. In a variable compression ratio piston for an internal combustion engine having an inner member and an outer member movable relative to one another to vary the compression ratio of the engine, a control system for regulating movement of said members comprising,
   (a) means defining a first chamber and a second chamber within said piston, said first and second chambers varying oppositely in volume in response to said movement of said members,
   (b) means for supplying a pressure fluid to said first chamber and means discharging fluid from said first chamber to said second chamber upon a predetermined pressure increase in said first chamber, and
   (c) a secondary discharge means disposed intermediate said chambers for discharging fluid from said first chamber upon a predetermined increase in pressure in said first chamber.
2. The combination as defined in claim 1, and in which said discharge means comprises,
   (a) a pressure regulating discharge valve in registry with said first chamber and operable to open to discharge fluid from said first chamber only when fluid pressure in said first chamber has increased to a predetermined value, and
   (b) a unidirectional valve member operable to permit fluid flow only in a direction from said first chamber into said second chamber.
3. The combination as defined in claim 2, and in which said secondary discharge means comprises a passage intermediate said discharge valve and said unidirectional valve and opening to the crankcase of the engine.
4. The combination as defined in claim 3, and in which said secondary discharge means further comprises a pressure responsive member normally closing said passage and operable to move to an open position upon a predetermined pressure increase intermediate said chambers.
5. In a variable compression ratio piston for an internal combustion engine having a carrier member adapted for connection via a wrist pin to a connecting rod of the engine and an outer piston member carried on and movable axially relative to the carrier member so that the crown of the outer piston member forms a variable boundary of the piston in the combustion chamber of a cylinder of the engine in which said piston reciprocates to thereby vary the clearance volume by movement of the crown relative to the wrist pin center of the connecting rod, the combination therewith of a hydraulic control system for said piston comprising,
   (a) a first hydraulic chamber defined between said crown and an adjacent first surface of said carrier member and a second hydraulic chamber defined between a second surface of said carrier member and an adjacent surface of said outer piston member,
   (b) said first and second chambers varying oppositely in volume in response to said movement of said outer piston relative to said carrier member and means remote from said piston for supplying pressure fluid from a source thereof to said first chamber including a unidirectional flow valve,
   (c) a discharge passage from said first to said second chamber, a pressure regulating discharge valve in said passage permitting fluid flow into said passage from said first chamber only when fluid pressure in said first chamber exceeds a predetermined value, and
   (d) means for discharging oil from said passage bypassing said second chamber in response to a predetermined pressure being produced in said passage.
6. The combination as defined in claim 5, including a unidirectional flow valve disposed within said discharge passage intermediate said pressure regulating discharge valve and said second chamber and permitting fluid flow only into said second chamber.
7. The combination as defined in claim 5, and in which said discharge means comprises a second passage connecting said first mentioned passage to the crankcase in said engine, a normally closed needle valve assembly disposed within said second passage and pressure responsive means operable to variably open said needle valve assembly upon increase in pressure within said first mentioned passage.

8. The combination as defined in claim 5, and including a unidirectional valve means disposed within said passage intermediate said discharge valve and said second chamber and permitting oil flow only in a direction toward said second chamber, and said discharge means being disposed intermediate said unidirectional valve means and said discharge valve.

9. The combination as defined in claim 8, and in which said discharge means comprises a second passage communicating with said first mentioned passage and opening to the exterior of said piston, a variably regulating valve member carried in said second passage and pressure responsive means operable to variably open said valve member in response to increases in pressure within said first mentioned passage.

10. The combination as defined in claim 8, and in which said discharge means comprises a second passage connecting said first mentioned passage to the exterior of said piston and disposed intermediate said pressure regulating discharge valve and said second unidirectional valve means.

References Cited

UNITED STATES PATENTS

| | | | |
|---|---|---|---|
| 2,573,688 | 11/1951 | Butler | 123—78 |
| 2,573,689 | 11/1951 | Butler | 123—78 |
| 2,910,826 | 11/1959 | Mansfield | 123—78 |
| 3,156,162 | 11/1964 | Wallace et al. | 123—48 XR |
| 3,161,112 | 12/1964 | Wallace et al. | 123—48 |
| 3,185,137 | 5/1965 | Dreyer | 123—48 |
| 3,185,138 | 5/1965 | Druzynski | 123—48 |
| 3,303,831 | 2/1967 | Sherman | 123—78 |
| 3,311,096 | 3/1967 | Bachle et al. | 123—78 |

WENDELL E. BURNS, *Primary Examiner.*